(12) United States Patent
Kline

(10) Patent No.: US 9,002,154 B2
(45) Date of Patent: Apr. 7, 2015

(54) SEMICONDUCTOR THROUGH-WAFER ELECTRICAL SIGNAL-CARRYING VIRTUAL WAVEGUIDE

(75) Inventor: Eric V. Kline, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 676 days.

(21) Appl. No.: 12/848,119

(22) Filed: Jul. 31, 2010

(65) Prior Publication Data

US 2012/0027340 A1 Feb. 2, 2012

(51) Int. Cl.
*G02B 6/122* (2006.01)
*G02B 6/12* (2006.01)

(52) U.S. Cl.
CPC .................................. *G02B 6/12002* (2013.01)

(58) Field of Classification Search
None
See application file for complete search history.

(56) References Cited

U.S. PATENT DOCUMENTS

| | | | | |
|---|---|---|---|---|
| 4,396,833 | A | * | 8/1983 | Pan .......................... 250/214 R |
| 4,932,032 | A | | 6/1990 | Koch et al. |
| 5,337,183 | A | * | 8/1994 | Rosenblatt ................... 359/248 |
| 5,360,973 | A | | 11/1994 | Webb |
| 5,600,740 | A | * | 2/1997 | Asfar .............................. 385/27 |
| 5,994,983 | A | | 11/1999 | Andersson |
| 6,062,729 | A | | 5/2000 | Ni et al. |
| 6,156,165 | A | | 12/2000 | Pierson et al. |
| 7,016,569 | B2 | * | 3/2006 | Mule et al. ...................... 385/37 |
| 7,315,223 | B2 | | 1/2008 | Margomenos |
| 2003/0214703 | A1 | * | 11/2003 | Ovadia et al. ................. 359/344 |
| 2004/0071387 | A1 | * | 4/2004 | Mule et al. ...................... 385/14 |
| 2012/0027340 | A1 | * | 2/2012 | Kline .............................. 385/14 |

OTHER PUBLICATIONS

D.T. Kollman et al., "Ultra-wideband silicon through-wafer transmission lines," IEEE MTT-S, 2004, vol. 2, pp. 489-492.
M. Raburn et al., "Optimization and Assessment of Shape, Alignment and Structure in InP/InGaAsP Waveguide Vertically Coupled Optical Add-Drop Multiplexers," IPRM, 2002, pp. 131-134.

(Continued)

*Primary Examiner* — Andrew Jordan
(74) *Attorney, Agent, or Firm* — Walter W. Duft

(57) ABSTRACT

A through-wafer electrical signal communication apparatus and method utilize a semiconductor substrate having first and surfaces and a continuous peripheral edge. The first surface supports active integrated circuit components. An electromagnetic waveguide supports data communication through the semiconductor substrate. The waveguide has an electrically conductive waveguide boundary structure surrounding a waveguide interior region formed by a portion of the semiconductor substrate. The waveguide is sized and configured to propagate electromagnetic waves of selected wavelength and propagation mode from a first waveguide end to a second waveguide end. A signal launching structure radiates electromagnetic waves into the first waveguide end. A signal pickup structure receives electromagnetic waves from the second waveguide end. The apparatus and method may utilize one or more of the waveguides. The waveguides may include a real waveguide, one or more virtual waveguide formed using light energy, and/or a hybrid waveguide comprising real and virtual waveguide structures.

14 Claims, 4 Drawing Sheets

(56) References Cited

OTHER PUBLICATIONS

G. W. Turner et al., "Through-Wafer Optical Communication Using Monolithic InGaAs-on-Si LED's and Monolithic PtSi-Si Schottky-Barrier Detectors," IEEE Photon., Technol. Lett., vol. 3, 1991, pp. 761-763.

S. W. Bond et al., "A Three-Layer 3-D Silicon System Using Through-Si Vertical Optical Interconnections and Si CMOS Hybrid Building Blocks", IEEE J. Special Topics Quantum Electron. Smart Photonics Issue, Mar. 1999, pp. 276-286.

* cited by examiner

SEMICONDUCTOR THROUGH-WAFER ELECTRICAL SIGNAL-CARRYING VIRTUAL WAVEGUIDE

BACKGROUND

1. Field

The present disclosure relates to semiconductor devices. More particularly, the disclosure concerns through-wafer data communication.

2. Description of the Prior Art

By way of background, semiconductor through-wafer signal communication has been proposed using optical and electrical signal carrying techniques. Applications include through-wafer communication of data signals, clock signals or other information. The optical technique passes signal information through the wafer using modulated light. A disadvantage of this approach is that optical signal processing is required to modulate and demodulate the optical carrier. The electrical technique communicates signal information electrically using metal vias extending through the wafer. A disadvantage of this approach is that the semiconductor wafer can be disturbed or damaged by such structures.

SUMMARY

A through-wafer electrical signal communication apparatus and method utilize a semiconductor substrate having a first surface, a second surface and a continuous peripheral edge. The first surface is an active device surface supporting active integrated circuit components and the second surface is a back surface. An electromagnetic waveguide supports electrical signal communication through the semiconductor substrate between the first and second surfaces. The waveguide has an electrically conductive waveguide boundary structure surrounding a waveguide interior region formed by a portion of the semiconductor substrate. The waveguide is sized and configured to propagate electromagnetic waves of selected wavelength and propagation mode from a first waveguide end to a second waveguide end. A signal launching structure is configured to radiate electromagnetic waves into the first waveguide end. A signal pickup structure is configured to receive electromagnetic waves from the second waveguide end. The apparatus and method may utilize one or more of the waveguides. The waveguides may include a real waveguide formed using an electrically conductive material, one or more virtual waveguides formed using light energy, and/or a hybrid waveguide comprising real and virtual waveguide structures.

BRIEF DESCRIPTION OF THE DRAWINGS

The foregoing and other features and advantages will be apparent from the following more particular description of example embodiments, as illustrated in the accompanying Drawings, in which.

DETAILED DESCRIPTION OF EXAMPLE EMBODIMENTS

Introduction

Figure 1:
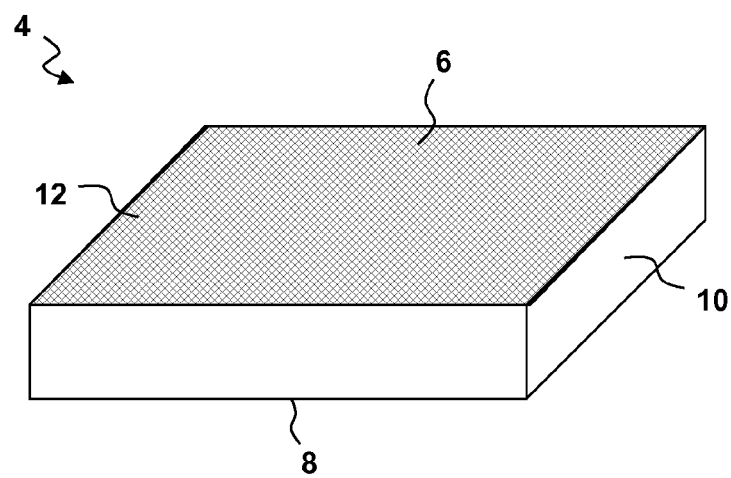
FIG. 1 is a perspective view showing an example semiconductor substrate that may be used in an apparatus that supports through-wafer data communication.

Turning now to the Drawings, which are not necessarily to scale, FIG. 1 illustrates a semiconductor substrate 4 that may be used to construct an apparatus supporting through-wafer electrical signal communication. The semiconductor substrate 4 may be a wafer or a die that has been cut from a wafer. It has a first surface 6 and an opposing second surface 8 that together define the substrate's thickness dimension. A continuous peripheral edge 10 defines a perimeter of the semiconductor substrate 4. The first surface 6 is an active device surface that supports active integrated circuit components 12. The second surface 8 is a back surface that may or may not include active components. The semiconductor substrate 4 may be formed from any suitable semiconductor material of a type that is conventionally used for integrated circuit devices, including but not limited to silicon, germanium, gallium-arsenide and other semiconductor materials. The semiconductor substrate 4 may be fabricated for use in many different kinds of apparatus, including but not limited to CPUs (Central Processing Units), information processing devices, memory devices, communication devices, and other device types that can process, store, generate, consume, use, communicate and/or otherwise manipulate information (including data and/or instructions). According to example embodiments described in more detail below, some or all of the information manipulated by the active integrated circuit components of the semiconductor substrate 4 may be communicated from one surface (6 or 8) of the semiconductor substrate 4 to the other. Such information may include digital information, analog information, or both. When such information is communicated through the semiconductor substrate 4, it may be referred to generically as signal information.

Figure 2:
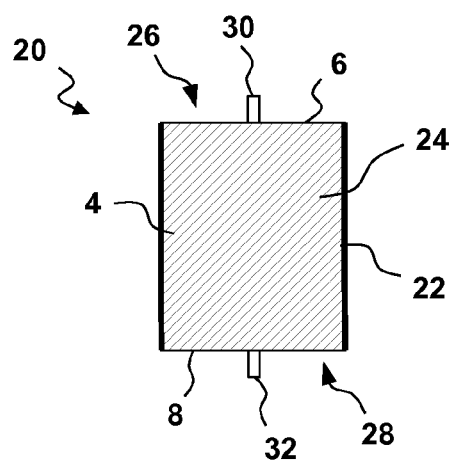
FIG. 2 is a cross-sectional centerline view of an electromagnetic waveguide that may be provided on the semiconductor substrate of FIG. 1 to support through-wafer data communication.

Turning now to FIG. 2, the ability to communicate electrical signal information through the semiconductor substrate 4 may be provided by an electromagnetic waveguide 20. As used herein, electrical signal communication refers to communication using sub-light frequency electromagnetic energy. As will be described in the context of example embodiments hereinafter, the waveguide 20 may extend through the semiconductor substrate 4 between the first surface 6 and the second surface 8, e.g., along the axis representing the substrate's thickness dimension. The waveguide 20 includes an electrically conductive waveguide boundary structure 22 that surrounds a waveguide interior region 24 comprising all or a portion of the semiconductor substrate 4.

Figure 3A:
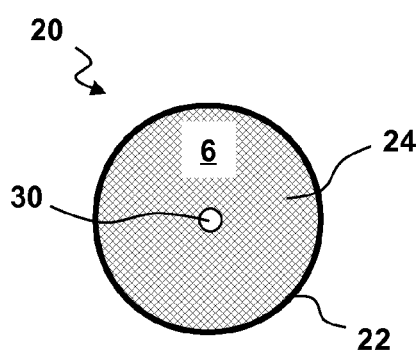
FIGS. 3A and 3B are plan views showing alternative configurations of the waveguide of FIG. 2.
Figure 3B:
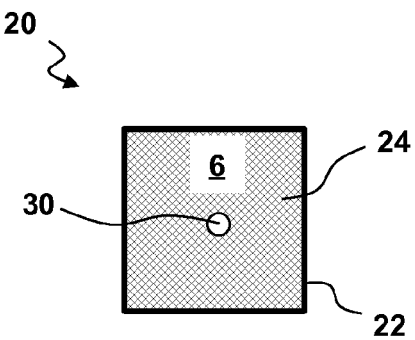

The waveguide 20 is sized and configured to propagate electromagnetic waves of selected wavelength and propagation mode from a first waveguide end 26 to a second waveguide end 28, with the waveguide interior region including the bulk material of the semiconductor substrate 4. FIG. 3A illustrates an embodiment in which the waveguide 20 is of circular cross-section. FIG. 3B illustrates an embodiment in which the waveguide 20 is of rectangular cross-section. Other shapes could potentially also be used. As is known in the art, increasing a waveguide's cross-sectional area allows longer wavelengths to be propagated, and visa versa. It is contemplated that the waveguide 20 may be readily designed to handle signals as low as several GHz into the THz range, which is suitable for high-speed digital devices. It will be appreciated that losses through the waveguide 20 (both conductor and dielectric) may need to be accounted for, but should be tolerable insofar as the distance through the semiconductor substrate 4 will usually be small due to the substrate's low thickness.

A signal launching structure 30 is configured to radiate electromagnetic energy into the first waveguide end 26. A signal pickup structure 32 is configured to receive electromagnetic energy from the second waveguide end 28. The structures 30 and 32 may be provided by conventional antenna launch and pickup stubs, respectively. It should be noted that FIG. 2 illustrates a configuration wherein the first waveguide end 26 and the signal launching structure 30 are situated at the active device surface 6 of the semiconductor substrate 4, and the second waveguide end 28 and the signal pickup structure 32 are situated at the back surface 8. This is for purposes of example only and it is to be understood that a reverse configuration may also be used.

First Example Embodiment

Figure 4:
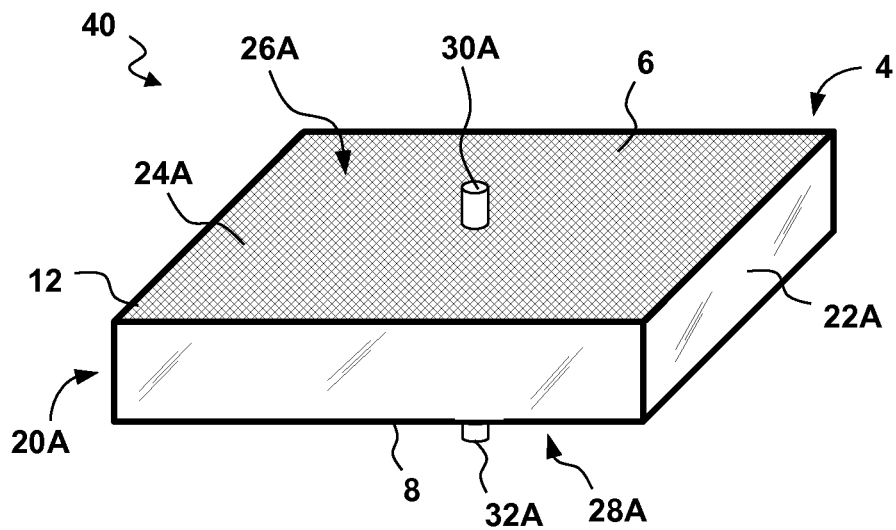
FIG. 4 is a perspective view showing a first embodiment of an apparatus with through-wafer electrical signal communication capability constructed from the semiconductor substrate of FIG. 1 and the waveguide of FIG. 2.

Turning now to FIG. 4, an apparatus 40 with through-wafer electrical signal communication capability is shown. The apparatus 40 is constructed from the semiconductor substrate 4 of FIG. 1 and further includes the waveguide 20 of FIG. 2 embodied as a real waveguide 20A. The real waveguide 20A includes a real waveguide boundary structure 22A formed by an electrically conductive material that surrounds the semiconductor peripheral edge 10. For example, the electrically conductive material may comprise an electrically conductive (e.g., metal) sleeve in which the semiconductor substrate 4 is situated. The conductive sleeve may either short the substrate peripheral edge 10 or an insulation layer could be added to electrically isolate the semiconductor substrate 4 from the conductive sleeve. Alternatively, the electrically conductive material may comprise an electrically conductive (e.g., metallization) coating applied to the substrate peripheral edge 10, or to an insulation layer surrounding the peripheral edge if electrical isolation is desired. The remaining components of the real waveguide 20A are as described above in connection with FIG. 2, as shown by the use of corresponding reference numbers appended with the letter "A." Thus, the real waveguide 20A includes a waveguide interior region 24A, a first waveguide end 26A and a second waveguide end 28A. In addition, the apparatus 40 includes a signal launching structure 30A and a signal pickup structure 32A.

A desired signal propagation mode of the waveguide 20A (e.g., TE, TM, hybrid modes, etc.) can be excited in the usual manner employing the launching structure 30A. The signal information is extracted at the pickup structure 32A following transmission through the waveguide. The electromagnetic signal carried by the waveguide 20A will be of a frequency greater than the waveguide's cutoff frequency. The waveguide's cutoff frequency will be a function of the material set and the waveguide geometry, all of which may be selected using known waveguide design principles. It will be appreciated that the geometry of the real waveguide 20A will be dictated by the shape and cross-sectional area of the semiconductor substrate 4, and consequently the waveguide size may be somewhat large. However, the wavelength cutoff may be suitable for propagating a clock signal. For example, the real waveguide 20A, which encompasses the entire bulk phase of the semiconductor substrate 4, may be used for clock distribution with minimal clock skew across the whole active device surface 6. In addition, higher frequency harmonics may also be propagated for data communication. Thus, the real waveguide 20A may be used for communicating a clock signal or a data signal. It could also be operated in a multiplexed mode (e.g., WDM) to carry one or more data and/or clock signals. The length of the waveguide 20A may be controlled by lapping the semiconductor substrate 4 to control its thickness.

Although not shown, through-wafer communication of digital information (as opposed to analog information) may be handled by using an digital-analog converter to convert the information to analog form upstream of the launching structure 30A. An analog-digital converter may then be placed downstream of the pickup structure 32A to convert the information back to digital form.

Second Example Embodiment

Figure 5:
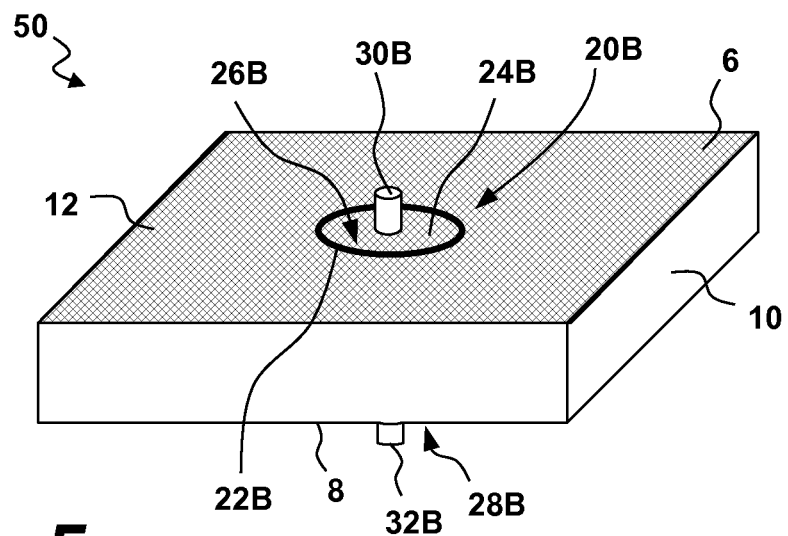
FIG. 5 is a perspective view showing a second embodiment of an apparatus with through-wafer electrical signal communication capability constructed from the semiconductor substrate of FIG. 1 and the waveguide of FIG. 2.
Figure 6:
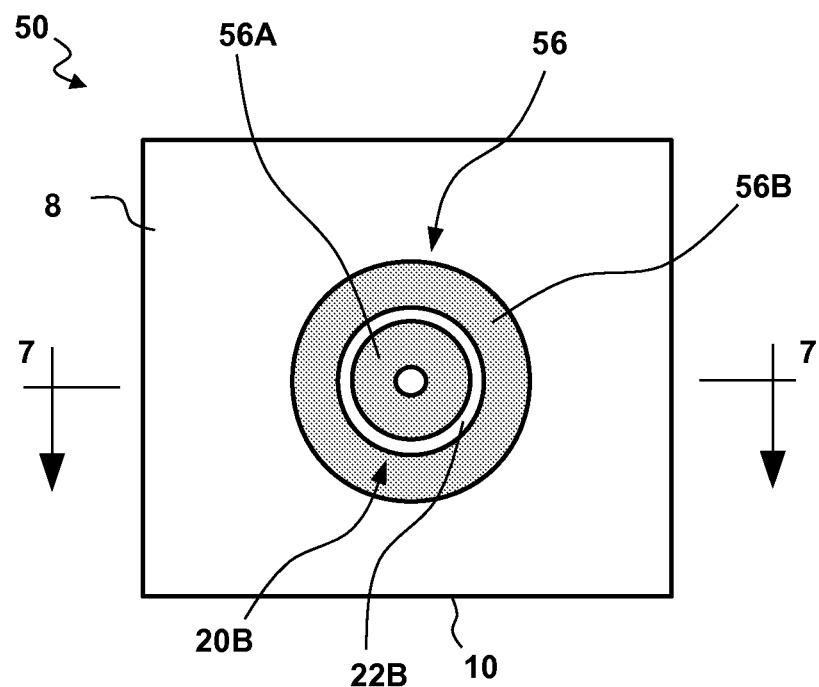
FIG. 6 is a bottom plan view of the apparatus of FIG. 5.
Figure 7:
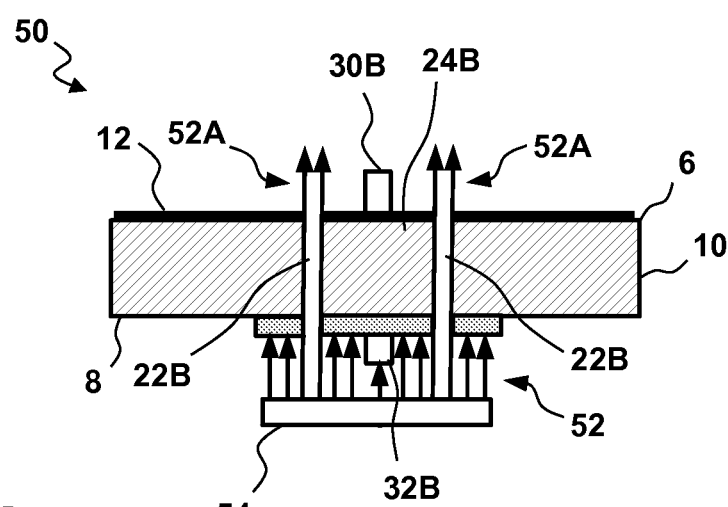
FIG. 7 is a cross-sectional view taken along line 7-7 in FIG. 6.

Turning now to FIGS. 5-7, another apparatus 50 with through-wafer electrical signal communication capability is shown. The apparatus 50 is constructed from the semiconductor substrate 4 of FIG. 1 and further includes the waveguide 20 of FIG. 2 embodied as a virtual waveguide 20B. The virtual waveguide 20B includes a virtual waveguide boundary structure 22B surrounding a virtual waveguide interior region 24B. The virtual waveguide boundary structure 22B is formed by an electrically conductive region of the semiconductor substrate 4. This region comprises free semiconductor charge carriers that have been excited into a conduction band by incident light 52 emitted by a light source 54 (see FIG. 7). The incident light 52 changes the index of refraction within the electrically conductive region of the semiconductor substrate 4 (relative to the electromagnetic signal being propagated). This produces a dielectric waveguide whose wave containment properties are determined by the index of diffraction differential and whose effective size for purposes of determining the waveguide cutoff frequency can be determined by mode field diameter analysis. For such waveguides, the index of refraction behavior is given by is given by Snell's Law;

$$n_1 \sin \theta_1 = n_2 \sin \theta_2,$$

where $n_1$ is the index of refraction corresponding to the waveguide core (interior region 24B), and $n_2$ is the index of refraction corresponding to the waveguide 'cladding' phase (boundary structure 22B). In a preferred embodiment, $n_1 > n_2$. Based on typical values for the index of refraction delta between excited free carriers (in usual concentrations) in bulk silicon and bulk silicon without free carrier excitation, the critical angle (of incidence) to achieve total internal signal reflection in the virtual waveguide 20B would be greater than approximately 40 degrees.

The incident light 52 may be emitted by the light source 54 onto either the active device surface 6 or the back surface 8 of the semiconductor substrate 4 in a selected pattern at a selected wavelength. In the embodiment of FIGS. 5-7, the light source 54 is on the back surface 8 because this area is not normally covered with active components. If desired, however, the light source 54 could be placed on the active device surface 6.

The incident light 52 emitted by the light source 54 may be collimated and can be shaped to define a desired waveguide configuration (e.g., cylindrical, rectangular) by placing a shaping pattern 56 (see FIGS. 6 and 7) between the light source 54 and the semiconductor substrate 4. The shaping pattern 56 includes an inner mask 56A that blocks an interior portion of the incident light 52. Only a portion 52A of the incident light that strikes the semiconductor substrate outside inner mask 56A creates the virtual waveguide boundary structure 22B. To help control the virtual waveguide boundary structure thickness, an optional second mask 56B may also be used. It will be seen in FIG. 6 that the inner mask 56A is circular in shape and that the outer mask 56B is annular in shape. This produces the illustrated cylindrical geometry of the virtual waveguide 30B. It will be appreciated that other mask shapes may be used to provide other virtual waveguide geometries.

The frequency of the incident light 52 required to excite the free-carriers of the semiconductor material into the conduction band may be of a specific monochromatic or near monochromatic wavelength (coherent or non-coherent) corresponding to the absorption band of the free-carriers in the semiconductor substrate 4. This will depend on the semiconductor material and its doping characteristics. The light should be non-reactive to the substrate material in the region of the virtual waveguide boundary structure 22B. The light transmission characteristics of semiconductor materials are well known. By way of example, it is known that light wavelengths between 1100-1300 nm (infrared light) are non-reactive to silicon semiconductor material and even low power levels will excite free carriers of doped silicon substrate material into the conduction band. Note that the substrate material is considered to be doped because CMOS and other integrated circuit devices are typically fabricated from p-type or n-type silicon (or other semiconductor material) such that the semiconductor substrate material will normally be intrinsically doped. It is therefore contemplated that the incident light 52 will excite free-carrier dopants in the semiconductor substrate 4 as opposed to producing phonon-assisted excitation of the bulk semiconductor phase.

One or more infrared light emitting diodes or other light emitting device(s) producing infrared light in the desired wavelength range may be used as the light source 54, depending on the desired optical power level. The light source 54 may be fabricated in any desired manner. In some cases, fiber optic elements or other light alignment structures may be used to collimate the incident light 52. To determine the optical power requirements, the light absorption coefficient for the free-carrier dopants in the semiconductor substrate material may be calculated using the Drude equation:

$$\alpha = (k_{fc})^{n,p} \lambda^2 \rho^{n,p},$$

where $k_{fc}$ is absorption coefficient for the specific free carriers (fc) under consideration, n and p represent the n-type and p-type silicon, $\lambda$ is wavelength and $\rho$ is the free carrier density.

If desired, the apparatus 50 may be maintained at a controlled reduced temperature to stabilize the conduction band free-carriers in the bulk material of the semiconductor substrate 4. This technique can be used to provide a desired index of refraction differential between the electrically conductive region of the waveguide boundary structure 22B and adjacent portions of the semiconductor substrate that are not excited by the incident light 52. Reducing the substrate temperature also increases the light transmission characteristics of the semiconductor substrate 4 for a given wavelength of the incident light 52. Increasing the doping level of the semiconductor substrate material will increase conductivity.

The light source 54 may have a substantially constant optical output under operating conditions and may be turned-off when the waveguide 20B is not required. Thus, the incident light requires no modulation. The pattern of conduction band free-carriers formed in the semiconductor substrate 4 by the incident light 52 constitutes the virtual waveguide boundary structure 22B. The non-illuminated semiconductor material inside the virtual waveguide boundary structure represents the virtual waveguide interior region 24B. The virtual waveguide 20B can be excited into a desired propagation mode (e.g., TE, TM, hybrid modes, etc.) of an electromagnetic signal of frequency greater than the waveguide's cutoff frequency. Again, the waveguide's cutoff frequency will be a function of the material set and the waveguide geometry, as may be determined using known waveguide design principles. Excitation of the desired propagation mode may be performed in the usual manner.

The remaining components of the virtual waveguide 20B are as described above in connection with FIG. 2, as shown by the use of corresponding reference numbers appended with the letter "B." Thus, in addition to the waveguide boundary structure 22B and the waveguide interior region 24B, the virtual waveguide 20B includes a first waveguide end 26B and a second waveguide end 28B. In addition, the apparatus 50 includes a signal launching structure 30B and a signal pickup structure 32B.

It will be appreciated that more than one of the virtual waveguides 20B could be formed on the semiconductor substrate 4. This would provide plural through-wafer signal pathways that could be used, for example, to provide plural data pathways or to provide multiple clock regions for distributed clocking with minimal clock skew across the active device surface 6. Each virtual waveguide 20B could have its own light source 54. Alternatively, a single instance of the light source 54 could be used for all of the virtual waveguides. Other light source/waveguide combinations could also be used.

Third Example Embodiment

Figure 8:
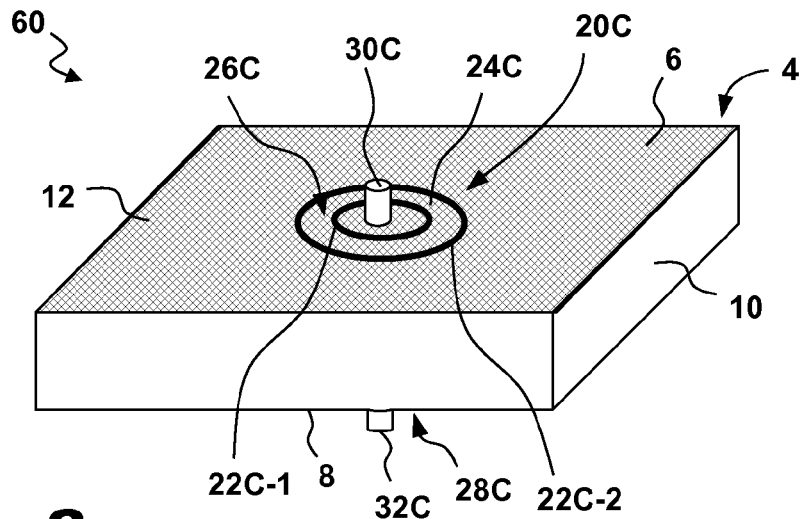
FIG. 8 is a perspective view showing a third embodiment of an apparatus with through-wafer electrical signal communication capability constructed from the semiconductor substrate of FIG. 1 and the waveguide of FIG. 2.

Turning now to FIG. 8, another apparatus 60 with through-wafer electrical signal communication capability is shown. The apparatus 60 is constructed from the semiconductor substrate 4 of FIG. 1 and further includes a virtual coaxial waveguide 20C designed for TEM mode signal propagation. The virtual coaxial waveguide 20C may be formed using the same technique used to make the virtual waveguide 20B of FIGS. 5-7. In this embodiment, a shaping pattern (not shown) patterns the incident light (not shown) to form an inner virtual propagation medium 22C-1 disposed within an outer virtual waveguide structure 22C-2. A separation region 24C of selected size lies between these two electrically conductive structures.

The remaining components of the virtual coaxial waveguide 20C are as described above in connection with FIG. 2, as shown by the use of corresponding reference numbers appended with the letter "C." Thus, in addition to the inner waveguide propagation medium 22C-1 and the outer waveguide boundary structure 22C-2, the virtual coaxial waveguide 20C includes a first waveguide end 26C and a second waveguide end 28C. In addition, the apparatus 60 includes a signal launching structure 30C and a signal pickup structure 32C.

Fourth Example Embodiment

Figure 9:
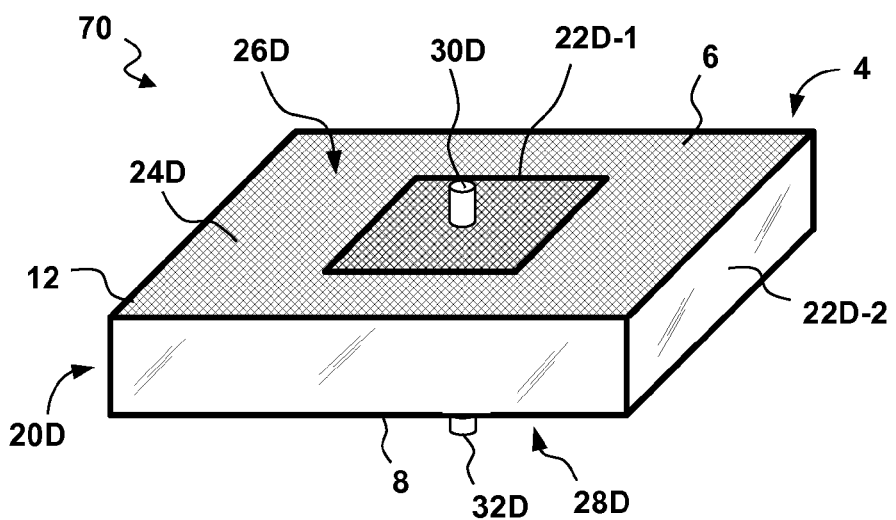
FIG. 9 is a perspective view showing a fourth embodiment of an apparatus with through-wafer electrical signal communication capability constructed from the semiconductor substrate of FIG. 1 and the waveguide of FIG. 2.

Turning now to FIG. 9, another apparatus 70 with through-wafer electrical signal communication capability is shown. The apparatus 70 is constructed from the semiconductor substrate 4 of FIG. 1 and further includes a hybrid virtual/real coaxial waveguide 20D designed for TEM mode signal propagation. The hybrid coaxial waveguide 20D includes an inner virtual waveguide propagation medium 22D-1 disposed within an outer real waveguide structure 22D-2. The inner virtual waveguide propagation medium 22D-1 may be formed using the same technique used to make the virtual waveguide 20B of FIGS. 5-7. The outer real waveguide boundary structure 22D-2 may be formed using the same technique used to make the real waveguide 20A of FIG. 4. A separation region 24D lies between these two electrically conductive structures.

The remaining components of the hybrid coaxial waveguide 20D are as described above in connection with FIG. 2, as shown by the use of corresponding reference numbers appended with the letter "D." Thus, in addition to the inner waveguide propagation medium 22D-1 and the outer waveguide boundary structure 22D-2, the hybrid coaxial waveguide 20D includes a first waveguide end 26D and a second waveguide end 28D. In addition, the apparatus 70 includes a signal launching structure 30D and a signal pickup structure 32D.

Accordingly, a semiconductor through-wafer electrical signal-carrying apparatus and method have been disclosed. While various embodiments have been described, it should be apparent that many variations and alternative embodiments could be implemented in accordance with the invention. It is understood, therefore, that the invention is not to be in any way limited except in accordance with the spirit of the appended claims and their equivalents.

What is claimed is:

1. An apparatus supporting through-wafer electrical signal communication, comprising:
    a semiconductor substrate having a first surface, a second surface and a continuous peripheral edge;
    said first surface being an active device surface of said apparatus supporting active integrated circuit components and said second surface being a back surface of said apparatus;
    an electromagnetic waveguide supporting sub-light frequency electrical signal communication through said semiconductor substrate between said first surface and said second surface;
    said waveguide having an electrically conductive waveguide boundary structure surrounding a waveguide interior region formed by a portion of said semiconductor substrate;
    said waveguide being sized and configured to propagate sub-light frequency electromagnetic waves of selected wavelength and propagation mode from a first waveguide end to a second waveguide end through said waveguide interior region;
    a signal launching structure configured to radiate electromagnetic waves into said first waveguide end;
    a signal pickup structure configured to receive electromagnetic waves from said second waveguide end; and
    wherein said waveguide is a virtual waveguide having a virtual waveguide boundary structure formed by an electrically conductive region of said semiconductor substrate comprising free semiconductor charge carriers that have been excited into a conduction band by incident light emitted by a light source onto one of said first or second surfaces in a selected pattern at a selected wavelength.

2. The apparatus of claim 1, wherein said apparatus includes a plurality of virtual waveguides.

3. The apparatus of claim 1, wherein said waveguide is a virtual coaxial waveguide in which said incident light is patterned to form an inner virtual waveguide propagation medium disposed within an outer virtual waveguide boundary structure.

4. The apparatus of claim 1, wherein said waveguide is a hybrid coaxial waveguide having an inner virtual waveguide propagation medium disposed within an outer real waveguide boundary structure, and wherein:
    said inner virtual waveguide propagation medium is formed by an electrically conductive region of said semiconductor substrate comprising free semiconductor charge carriers that have been excited into a conduction band by incident light emitted by a light source onto one of said first or second surfaces in a selected pattern at a selected wavelength; and
    said real waveguide boundary structure is formed by an electrically conductive material in interfacial contact with said semiconductor peripheral edge.

5. The apparatus of claim 1, wherein said signal launching structure emits electromagnetic waves that are encoded with a data signal, a clock signal, or which are multiplexed with one or more data and/or clock signals.

6. The apparatus of claim 1, wherein said light source is on said back surface of said apparatus.

7. The apparatus of claim 1, wherein said apparatus is maintained at a controlled temperature that provides a desired index of refraction differential between said electrically conductive region and adjacent portions of said semiconductor substrate.

8. A method supporting through-wafer electrical signal communication, comprising:
    providing an apparatus that comprises:
        a semiconductor substrate having a first surface, a second surface and a continuous peripheral edge;
        said first surface being an active device surface of said apparatus supporting active integrated circuit components and said second surface being a back surface of said apparatus;
        an electromagnetic waveguide supporting sub-light frequency electrical signal communication through said semiconductor substrate between said first surface and said second surface;
        said waveguide having an electrically conductive waveguide boundary structure surrounding a waveguide interior region formed by a portion of said semiconductor substrate;
        said waveguide being sized and configured to propagate sub-light frequency electromagnetic waves of selected wavelength and propagation mode from a first waveguide end to a second waveguide end through said waveguide interior region;
        a signal launching structure configured to radiate electromagnetic waves into said first waveguide end;

a signal pickup structure configured to receive electromagnetic waves from said second waveguide end; and wherein said waveguide is a virtual waveguide having a virtual waveguide boundary structure formed by an electrically conductive region of said semiconductor substrate comprising free semiconductor charge carriers that have been excited into a conduction band by incident light emitted by a light source onto one of said first or second surfaces in a selected pattern at a selected wavelength; and applying a launching signal to said signal launching structure; and receiving a pickup signal corresponding to said launching signal from said signal pickup structure.

9. The method of claim 8, wherein said apparatus includes a plurality of virtual waveguides.

10. The method of claim 8, wherein said waveguide is a virtual coaxial waveguide in which said incident light is patterned to form an inner virtual waveguide propagation medium disposed within an outer virtual waveguide boundary structure.

11. The method of claim 8, wherein said waveguide is a hybrid coaxial waveguide having an inner virtual waveguide propagation medium disposed within an outer real waveguide boundary structure, and wherein:

said virtual waveguide propagation medium is formed by an electrically conductive region of said semiconductor substrate comprising free semiconductor charge carriers that have been excited into a conduction band by incident light emitted by a light source onto one of said first or second surfaces in a selected pattern at a selected wavelength; and said real waveguide boundary structure is formed by an electrically conductive material in interfacial contact with said semiconductor peripheral edge.

12. The method of claim 8, wherein said launching signal and said pickup signal comprise a data signal, a clock signal, or one or more data and/or clock signals.

13. The method of claim 8, wherein said light source is on said back surface of said apparatus.

14. The method of claim 8, wherein said apparatus is maintained at a controlled temperature that provides a desired index of refraction differential between said electrically conductive region and adjacent portions of said semiconductor substrate.

* * * * *